(12) United States Patent
Noble et al.

(10) Patent No.: US 9,315,083 B2
(45) Date of Patent: Apr. 19, 2016

(54) FRAME HANGER FOR PROVIDING THRUST ANGLE ALIGNMENT IN VEHICLE SUSPENSION

(71) Applicant: Hendrickson USA, L.L.C., Itasca, IL (US)

(72) Inventors: Shawn D. Noble, Naperville, IL (US); Matthew J. Van Meter, Plainfield, IL (US); Joseph Martin, Addison, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/331,661

(22) Filed: Jul. 15, 2014

(65) Prior Publication Data

US 2016/0016449 A1 Jan. 21, 2016

(51) Int. Cl.
*B60G 7/02* (2006.01)
*B60G 9/02* (2006.01)

(52) U.S. Cl.
CPC .. *B60G 7/02* (2013.01); *B60G 9/02* (2013.01); *B60G 2204/4302* (2013.01)

(58) Field of Classification Search
CPC .................................. B60G 7/02; B60G 9/02
See application file for complete search history.

(56) References Cited

U.S. PATENT DOCUMENTS

| | | |
|---|---|---|
| 3,231,258 A | 1/1966 | Brownyer et al. |
| 3,531,099 A | 9/1970 | King |
| 3,653,683 A | 4/1972 | Hendrickson |
| 3,730,549 A | 5/1973 | Turner, Jr. |
| 3,792,871 A | 2/1974 | Chalmers |
| 4,465,300 A | 8/1984 | Raidel, Sr. |
| 4,802,690 A | 2/1989 | Raidel |
| 5,018,756 A | 5/1991 | Mitchell |
| 5,037,126 A | 8/1991 | Gottschalk |
| 5,230,528 A | 7/1993 | Van Raden et al. |
| 5,346,247 A | 9/1994 | Snyder |
| 5,620,194 A | 4/1997 | Keeler et al. |
| 5,649,719 A | 7/1997 | Wallace et al. |
| 5,785,345 A | 7/1998 | Barlas et al. |
| 5,887,881 A | 3/1999 | Hatch |
| 5,924,712 A | 7/1999 | Pierce |

(Continued)

FOREIGN PATENT DOCUMENTS

| | | |
|---|---|---|
| DE | 1959496 | 6/1971 |
| DE | 4338651 | 3/1995 |

(Continued)

OTHER PUBLICATIONS

International Searching Authority, International Search Report and Written Opinion for PCT/US2015/034124 mailed Sep. 2, 2015, 9 pages.

(Continued)

*Primary Examiner* — Faye M Fleming
(74) *Attorney, Agent, or Firm* — McDonnell Boehnen Hulbert & Berghoff LLP

(57) ABSTRACT

A frame hanger having a frame attachment portion having a first mounting surface and a second mounting surface, a first control arm mounting portion positioned beneath the frame attachment portion, wherein a first plurality of elongated longitudinally extending slots extend through the first mounting surface of the frame attachment portion, and wherein a second plurality of elongated longitudinally extending slots extend through the second mounting surface of the frame attachment portion.

28 Claims, 9 Drawing Sheets

(56) References Cited

U.S. PATENT DOCUMENTS

| | | | |
|---|---|---|---|
| 6,007,078 A * | 12/1999 | Gottschalk | B60G 7/02 280/81.6 |
| 6,038,163 A | 3/2000 | Clemens et al. | |
| 6,092,819 A | 7/2000 | Overby et al. | |
| 6,129,369 A | 10/2000 | Dudding | |
| 6,158,750 A | 12/2000 | Gideon et al. | |
| 6,195,266 B1 | 2/2001 | Padgett et al. | |
| 6,209,896 B1 | 4/2001 | Hickling | |
| 6,311,993 B1 | 11/2001 | Hulstein et al. | |
| 6,328,322 B1 | 12/2001 | Pierce | |
| 6,390,485 B1 | 5/2002 | Cadden | |
| 6,398,236 B1 | 6/2002 | Richardson | |
| 6,439,588 B1 | 8/2002 | Svensson | |
| 6,527,286 B2 | 3/2003 | Keeler et al. | |
| 6,585,286 B2 | 7/2003 | Adema et al. | |
| 6,834,873 B1 | 12/2004 | Vander Kooi et al. | |
| 7,168,718 B2 | 1/2007 | Svartz | |
| 7,500,687 B2 | 3/2009 | Dare-Bryan | |
| 7,748,726 B2 | 7/2010 | Dudding et al. | |
| 7,926,836 B2 | 4/2011 | Noble et al. | |
| 8,052,166 B2 | 11/2011 | Noble et al. | |
| 8,152,195 B2 | 4/2012 | Noble et al. | |
| 8,192,106 B2 | 6/2012 | Vogler et al. | |
| 8,262,112 B1 | 9/2012 | Noble et al. | |
| 8,302,988 B2 | 11/2012 | Noble | |
| 8,657,315 B2 | 2/2014 | Noble et al. | |
| 2002/0117816 A1 | 8/2002 | Dudding et al. | |
| 2004/0150142 A1 | 8/2004 | Warinner et al. | |
| 2005/0110233 A1 | 5/2005 | Hedenberg | |
| 2005/0236798 A1 * | 10/2005 | Hunt | B60G 7/02 280/124.175 |
| 2005/0280238 A1 | 12/2005 | Keeler | |
| 2006/0180967 A1 | 8/2006 | Adema et al. | |
| 2007/0126263 A1 * | 6/2007 | Ramsey | B60G 7/02 296/203.01 |
| 2011/0115184 A1 | 5/2011 | Johnson et al. | |
| 2011/0175314 A1 | 7/2011 | Ohra-Aho et al. | |

FOREIGN PATENT DOCUMENTS

| | | |
|---|---|---|
| DE | 4334369 | 4/1995 |
| EP | 1 893 428 | 11/2011 |
| JP | 08-156551 | 6/1996 |
| JP | 11-059154 | 3/1999 |
| JP | 2000233621 | 8/2000 |

OTHER PUBLICATIONS

Hendrickson, Hendrickson suspensions available on Spartan chassis, www.hendrickson-intl.com, 45745-301, 2007, 2 pages.

Hendrickson, HAS Series, Single-axle Air Suspension, www.hendrickson-intl.com, 45745-080 Rev D, 2008, 2 pages.

Hendrickson, Technical Bulletin, Primaax EX Firemaax Ex/ Primaax Firemaax Series, Pivot Bushing and D-Pin Bushing Inspection, Lit No. SEU-0235, May 2012, Revision A, 4 pages.

Hendrickson, Technical Procedure, Primaax EX Firemaax Ex/ Primaax Firemaax Series, Service Instructions, Lit. No. 17730-238, May 2012, Revision D, 104 pages.

Hendrickson, Technical Procedure Comfort Air, Service Instructions, 17730-236, Dec. 2007, Rev. B, 36 pages.

Hendrickson, Comfort Air Single Air Suspension, www.hendrickson-intl.com, 45745-173 Rev. C, 2010, 4 pages.

Hendrickson, Primaax EX Freightliner Vendor Components, 45745-288 Rev. C, 2010, 2 pages.

Hendrickson, RS Series Rubber Load Cushion, Feb. 2000, 2 pages.

Kenworth, Air Suspensions, Example of pre-Mar. 2013 suspension, 8 pages.

Neway, Neway Ad Series, Drive-Axle Air Suspension, www.safholland.com, XL-PS10448SL-en-US Rev A, 2012, 8 pages.

Neway, Severe-Duty Solutions for Trucks, Tractors and Trailers, www.safholland.com, XL-MP10006SL-en-US Rev A, 2014, 10 pages.

Neway, Neway ADZ Series Heavy-Duty Drive Axle Air Suspension, www.safholland.com, XL-PS10450SL-en-US Rev C, 2014, 8 pages.

Meritor RHP Ride Sentry MPA series, pre-2013, 1 page.

Hendrickson Truck Suspension Systems, A Boler Company, R Series Solid Mount, Jul. 1999, 2 pages.

Hendrickson, Technical Procedure, Non-Steerable Suspension Systems, Installation Instructions, H621, Dec. 2013, 16 pages.

\* cited by examiner

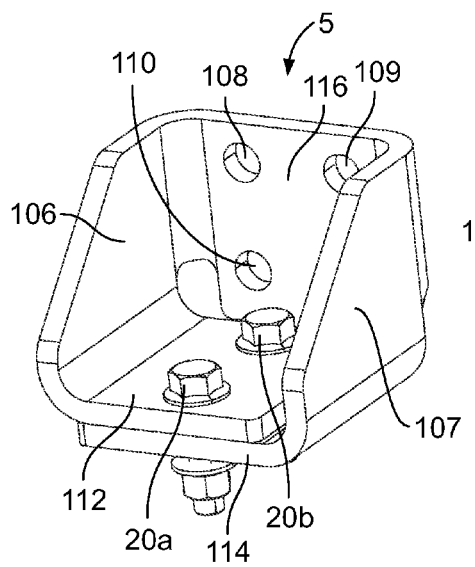
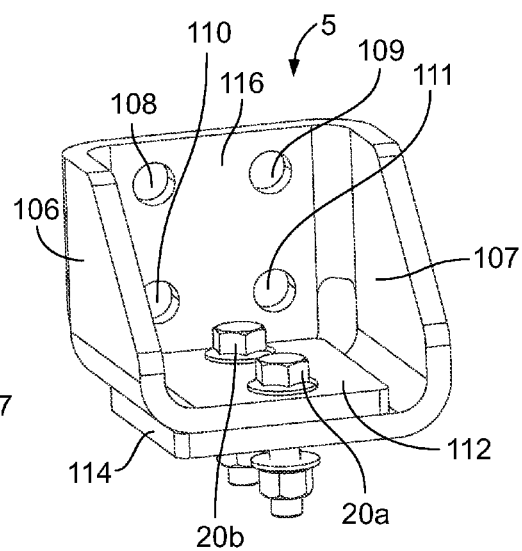
FIG. 7A    FIG. 7B
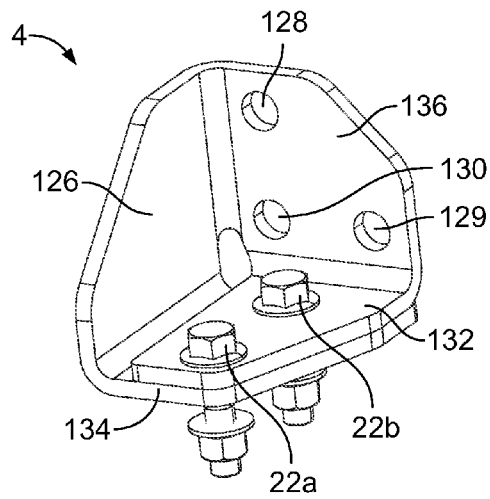
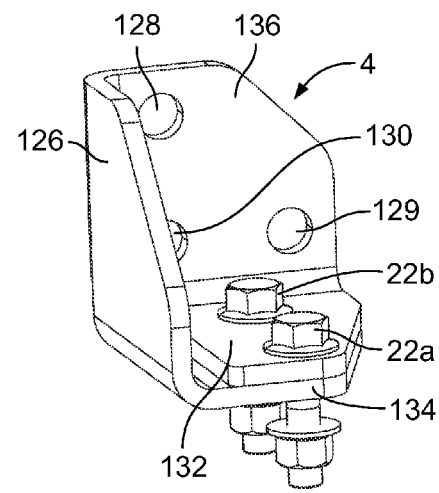
FIG. 8A    FIG. 8B

FRAME HANGER FOR PROVIDING THRUST ANGLE ALIGNMENT IN VEHICLE SUSPENSION

BACKGROUND

The present application generally relates to innovations and improvements in vehicle suspensions. More particularly, the present application relates to a frame hanger and associated vehicle suspension that provides for thrust angle alignment of an axle in a vehicle, and may be useful in multiple axle (i.e., tandem or tridem) on-off highway truck applications, or be applied to a single axle, such as a 4×2 commercial vehicle.

The centerline of a vehicle may be viewed as a line drawn through the midpoint between the wheels on a front axle and midpoint between the wheels on a rear axle. The direction of thrust of the vehicle, or the thrust line, is normally perpendicular to a position of the rear axle; although with an independent rear suspension, the thrust line is a line derived by splitting the toe angle of the rear wheels on the vehicle. Thus, the thrust line refers to the direction of vehicle thrust.

Ideally, the thrust line and the vehicle centerline coincide and are in alignment with each other. However, given the size of the vehicle, manufacturing tolerances, stresses, and component wear, the vehicle centerline and the thrust line often are not aligned, resulting in a thrust angle. The "thrust angle" is the angle between the centerline of the vehicle and the direction of thrust, or thrust line. In order to align the thrust angle, the orientation of the front and/or rear axle with respect to the vehicle frame may be adjusted. Prior designs have utilized square U-shaped shims to adjust the thrust angle at the connection of a bar pin at the walking beam, effectively changing the thickness around the bar pin at the walking beam. This method could be used to adjust the thrust angle; however, it also had the undesirable effect of adjusting the pinion angle of the axle. As a result, adjustments to the thrust angle in these circumstances could require further adjustments to the pinion angle of the axle, resulting in additional time, effort, and cost expended during vehicle set up.

Consequently, there is a need to provide a way to adjust the thrust angle alignment of an axle on a vehicle that does not also result in a change of the pinion angle of the axle. In other words, it would be desirable to provide a vehicle suspension that could be used to adjust align an axle with the direction of thrust, without affecting the pinion angle of the axle. Thus, there is a need to provide thrust angle alignment of an axle independently from adjustment of the pinion angle of the axle.

SUMMARY

In one aspect, a frame hanger for use in a vehicle suspension is provided having a frame attachment portion having a first mounting surface and a second mounting surface, a first control arm mounting portion positioned beneath the frame attachment portion, wherein a first plurality of elongated longitudinally extending slots extend through the first mounting surface of the frame attachment portion, and wherein a second plurality of elongated longitudinally extending slots extend through the second mounting surface of the frame attachment portion.

In a further aspect, a suspension assembly for supporting a longitudinally extending vehicle frame rail is provided having a frame hanger, an axle attachment member mounted to a first vehicle axle, a first control arm having a first end mounted to, and extending from, a first control arm mounting portion positioned on the frame hanger; and said first control arm having a second end mounted to the axle attachment member, wherein the frame hanger includes a frame attachment portion having a first mounting surface and a second mounting surface, wherein the first control arm mounting portion is positioned beneath the frame attachment portion, wherein a first plurality of elongated longitudinally extending slots extend through the first mounting surface of the frame attachment portion, and wherein a second plurality of elongated longitudinally extending slots extend through the second mounting surface of the frame attachment portion.

BRIEF DESCRIPTION OF THE DRAWINGS

Exemplary embodiments of the invention are described herein with reference to the drawings, wherein like parts are designated by like reference numerals, and wherein:

FIG. 7A is a right side perspective view of frame bracket 5 shown in FIG. 6;

FIG. 7B is a left side perspective view of frame bracket 5 shown in FIG. 6;

FIG. 8A is a right side perspective view of frame bracket 4 shown in FIG. 6;

FIG. 8B is a left side perspective view of frame bracket 4 shown in FIG. 6;

DETAILED DESCRIPTION

Figure 1:
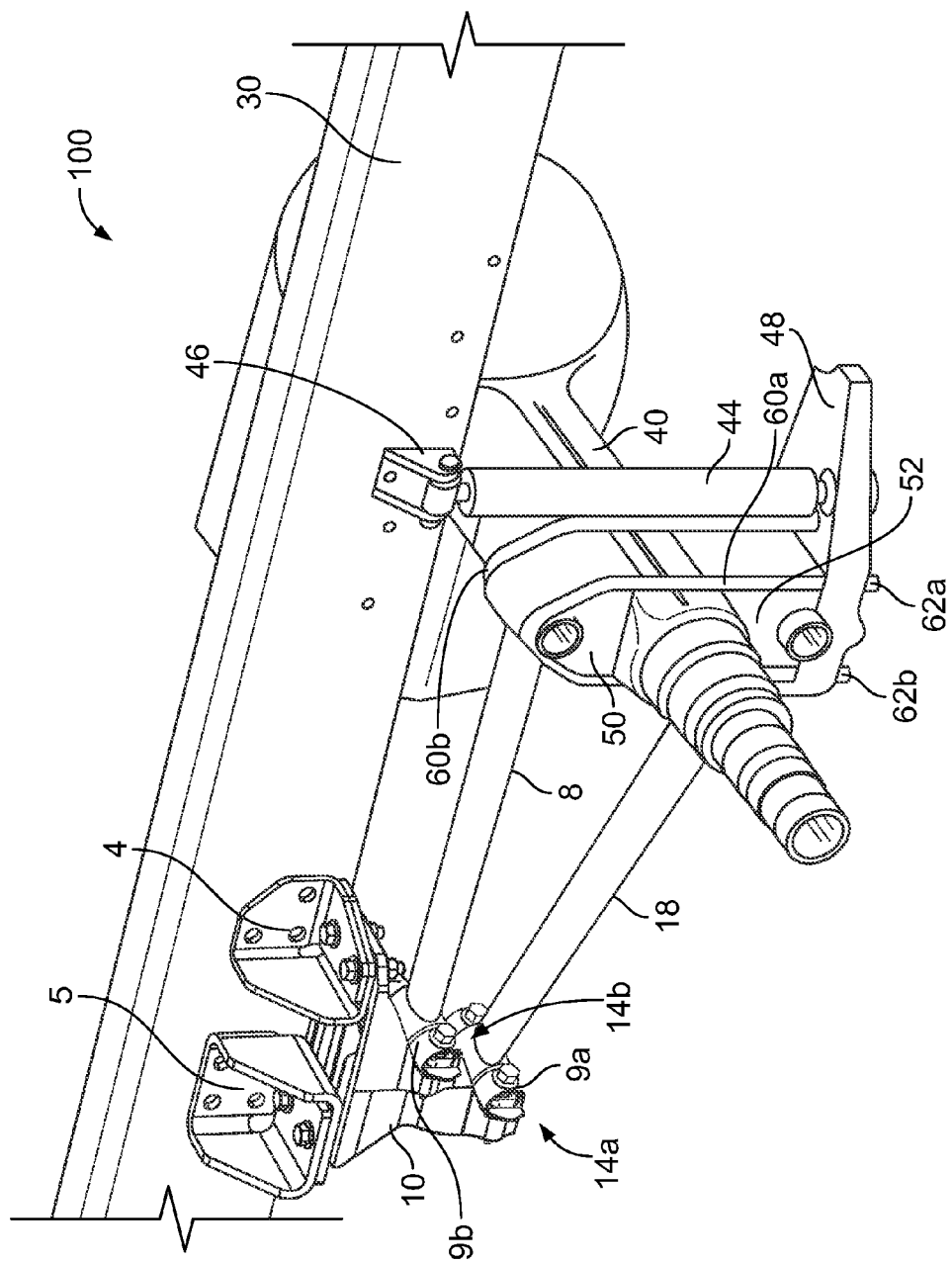
FIG. 1 is a perspective view of vehicle suspension 100 shown with vehicle frame rail in a trailing configuration.

FIG. 1 is a perspective view of vehicle suspension 100 shown with vehicle frame rail 30 and axle 40 in a trailing configuration. As will be appreciated by those skilled in the art, components for the vehicle suspension 100 may be duplicated on each side of the vehicle. Vehicle frame rail 30 may have various configurations or cross-sections, such as C-shaped or I-shaped frame rails. As will be appreciated by those skilled in the art, vehicle wheels (not shown) may be mounted to the ends of the vehicle axle 40 in a known manner. Further, it will be appreciated that the vehicle frame rail 30 may be connected by one or more vehicle frame cross members (not shown).

It will also be appreciated that vehicle suspension 100, and the components used therein are exemplary, and that the various components could have different shapes and sizes. Thus, for example, frame hanger 10 could have a different shape, and could have an integral frame attachment portion, or a single frame bracket that is attached to frame hanger 15, as well as first and second frame brackets 4 and 5 as shown in FIG. 1. In addition, as used herein, the term "control arm" is to be broadly construed and may be synonymous with the term "control rod," and includes any member that is used to connect one vehicle component to another vehicle component.

It should be understood that the term "vehicle" is used broadly herein to encompass all kinds of vehicles, including, but not limited to, all forms of cars, trucks, buses, recreational vehicles (RVs), etc., whether or not they include an engine. Moreover, for purposes of this description, unless specifically described otherwise, the term "vehicle" herein refers to a vehicle or a trailer. In this way, for example, a vehicle suspension system refers to a vehicle suspension or a trailer suspension.

As shown in FIG. 1, suspension 100 includes a frame hanger 10 that is attached to a first frame bracket 4 and a second frame bracket 5, which may be mounted to vehicle frame rail 30. An upper control arm 8 extends from the frame hanger 10 and is mounted to upper axle attachment member 50. The upper control arm 8 is mounted to frame hanger 10 using a bushing assembly 14b having bushing 9b. A lower control arm 18 extends from frame hanger 10 below the upper control arm 8, and the lower control arm 18 is mounted to lower axle attachment member 52. The lower control arm 8 is mounted to frame hanger 10 using a bushing assembly 14a having bushing 9a. The upper control arm 8 and lower control arm 18 are attached to axle 40 via upper axle attachment member 50 and lower axle attachment member 52 with U-shaped bolts 60a and nuts 62a and 62b, as well as U-shaped bolt 60b and nuts (not shown). Suspension 100 is shown in a trailing configuration in FIG. 1, although it may also be used in a leading configuration if desired.

Figure 2:
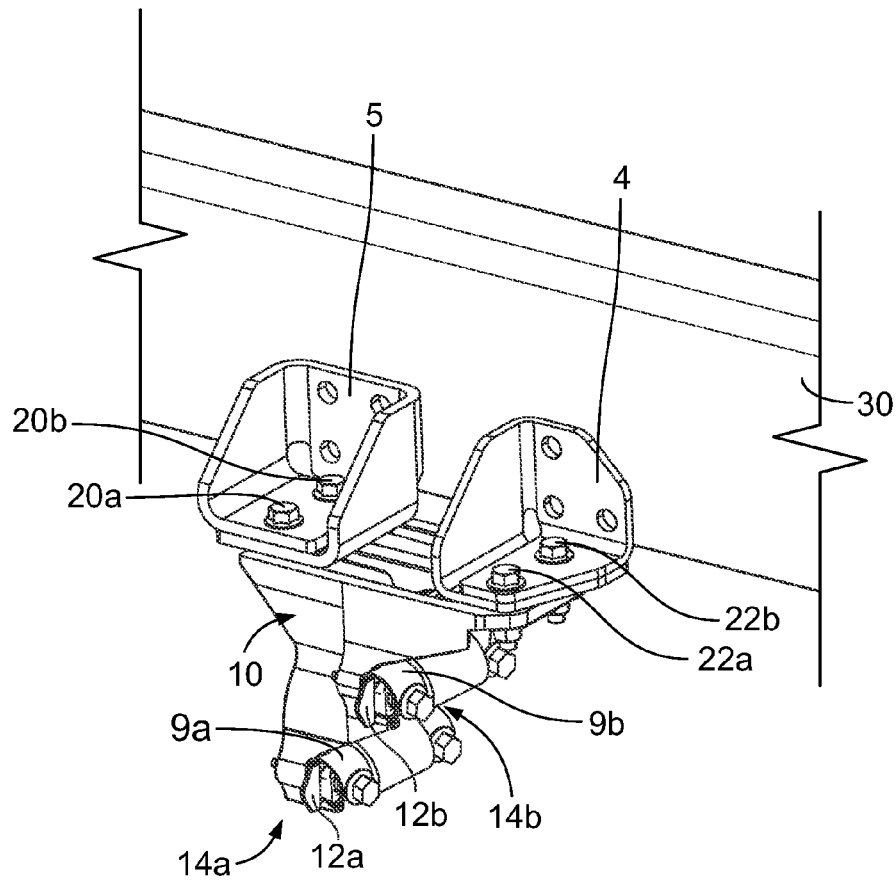
FIG. 2 is a perspective view of suspension frame hanger 10 and frame brackets 4 and 5 shown in FIG. 1 positioned adjacent vehicle frame rail 30.

FIG. 2 is a perspective view of suspension frame hanger 10 and frame brackets 4 and 5 shown in FIG. 1 positioned adjacent vehicle frame rail 30. In FIG. 2, frame bracket 4 is shown bolted to frame hanger 10 with bolts 22a and 22b, which in a preferred embodiment are M16 fasteners. Additional bolts or fasteners of varying sizes, threaded or unthreaded, may also be used to attach frame bracket 4 to frame hanger 10. Frame bracket 5 is shown bolted to frame hanger 10 with bolts 20a and 20b, which in a preferred embodiment are M16 fasteners. Additional bolts or fasteners of varying sizes, threaded or unthreaded, may also be used to attach frame bracket 5 to frame hanger 10.

Frame hanger 10 is shown with bushing assembly 14b which may be used to attach the upper control arm 8 to frame hanger 10. In this embodiment, bushing assembly 14b utilizes a cross arm member 12b. Similarly, frame hanger 10 is shown with bushing assembly 14a which may be used to attach the lower control arm 18 to frame hanger 10. In this embodiment, bushing assembly 14a utilizes a cross arm member 12a. It will be appreciated by those of skill in the art that the frame hanger 10 is shown in an exemplary configuration and could be provided with a different geometry and be configured differently. For example, it could be designed to accommodate a single control arm, or additional control arms. It could also be designed to accommodate different size or style control arms, and different size or style of bushing.

Furthermore, in the disclosed embodiments, two separate frame brackets 4 and 5 are shown mounted to frame hanger 10. However, a single frame bracket could also be used. Moreover, it is also possible in some embodiment to provide a frame hanger having a frame bracket for attachment to the vehicle frame rail integrally formed with the frame hanger.

Figure 3:
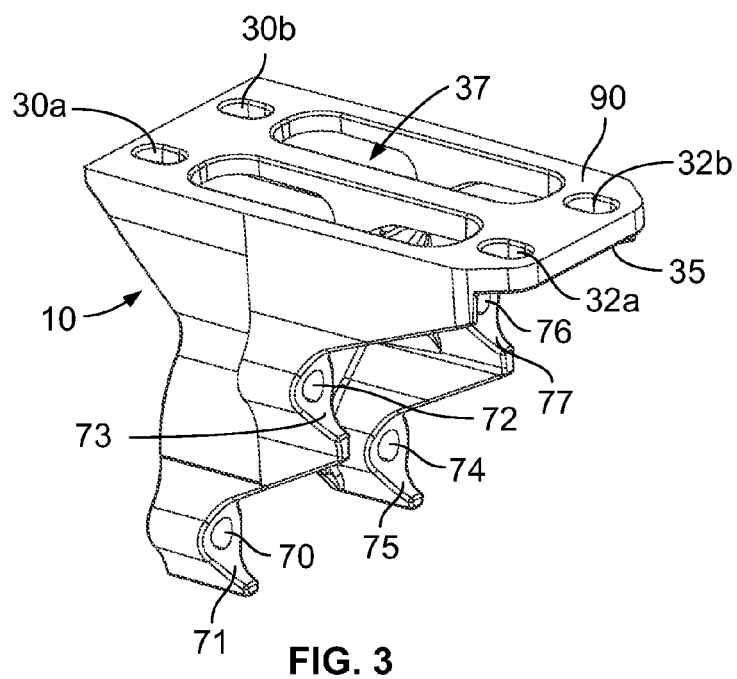
FIG. 3 is a perspective view of frame hanger 10 shown in FIGS. 1 and 2.

FIG. 3 is a perspective view of frame hanger 10 shown in FIGS. 1 and 2. In this embodiment, the frame hanger 10 includes a pair of elongated slots 30a and 30b longitudinally extending on mounting surface 90 of frame hanger 10. The term "longitudinally" as used herein means extending in a direction from the rear of a vehicle to a front of the vehicle. Elongated slots 30a and 30b correspond to holes positioned in frame bracket 5 through which bolts 20a and 20b extend. Thus, frame bracket 5 is mounted to frame hanger 10 by inserting bolts 20a and 20b through the frame bracket 5 and through elongated slots 30a and 30b on mounting surface 90 of frame hanger 10. Additional elongated slots, or even a single elongated slot, could also be used The frame hanger 10 also includes a pair of elongated slots 32a and 32b longitudinally extending on mounting surface 90 of frame hanger 10. Elongated slots 32a and 32b correspond to holes positioned in frame bracket 4 through which bolts 22a and 22b extend. Thus, frame bracket 4 is mounted to frame hanger 10 by inserting bolts 22a and 22b through the frame bracket 4 and through elongated slots 32a and 32b on mounting surface 90 of frame hanger 10.

Frame hanger 10 also includes voids 37 and 39 that reduce the weight of frame hanger 10. The frame hanger may be formed as a steel casting, although it could also be fabricated. Further, frame hanger 10 is shown with a first upper bar pin attachment interface 73, a second upper bar pin attachment interface 77, and a first control arm slot positioned between the first upper bar pin attachment interface 73 and the second upper bar pin attachment interface 75. The first upper bar pin attachment interface 73 includes a throughhole 72 and the second upper bar pin attachment interface 77 include a throughhole 76 for mounting to bar pin bushing assembly 14b (shown in FIGS. 1 and 2).

Frame hanger 10 is also shown with a first lower bar pin attachment interface 71, a second lower bar pin attachment interface 75, and a second control arm slot positioned between the first lower bar pin attachment interface 71 and the second lower bar pin attachment interface 75. The first lower bar pin attachment interface 71 includes a throughhole 70 and the second lower bar pin attachment interface 75 includes a throughhole 74 for mounting to bar pin bushing assembly 14a (shown in FIGS. 1 and 2).

Figure 4:
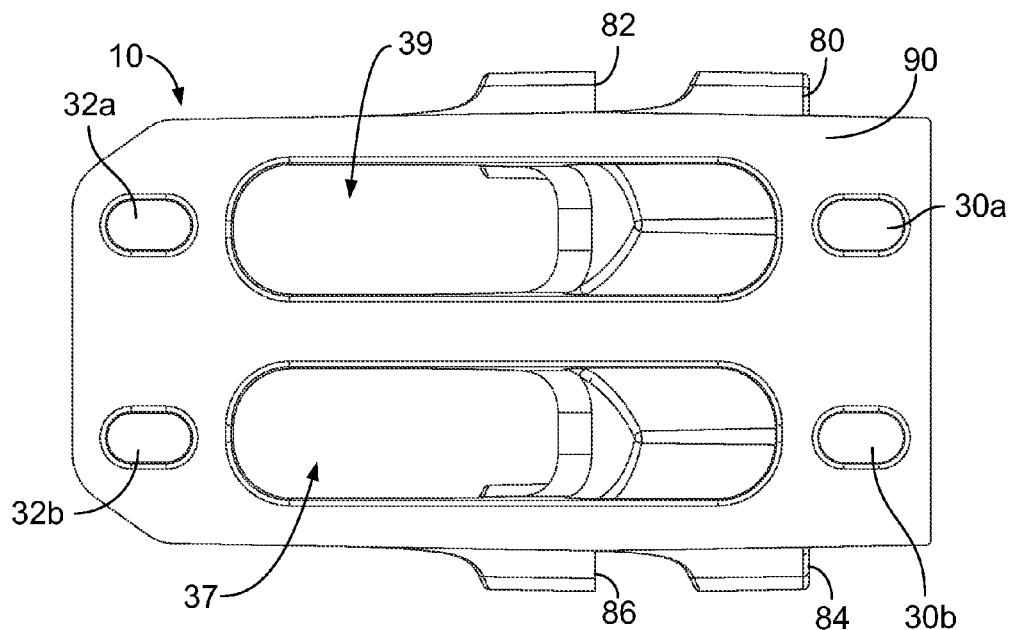
FIG. 4 is a top view of frame hanger 10 shown in FIGS. 1-3.

FIG. 4 is a top view of frame hanger 10 shown in FIGS. 1-3. Void 39 is shown extending between elongated slots 32a and 30a on mounting surface 90, and void 37 is shown extending between elongated slots 32b and 30b on mounting surface 90. A flat surface 82 is shown on the rear end of upper bar pin attachment interface 73 and a flat surface 86 is shown on the rear end of upper bar pin attachment interface 77. Flat surfaces 82 and 86 are used for the attachment of bolts in the cross arm bushing assembly 14b (shown in FIGS. 1 and 2). Similarly, a flat surface 80 is shown on the rear end of lower bar pin attachment interface 71 and a flat surface 84 is shown on the rear end of lower bar pin attachment interface 75. Flat surfaces 80 and 84 are used for the attachment of bolts in the cross arm bushing assembly 14a (shown in FIGS. 1 and 2).

Figure 5:
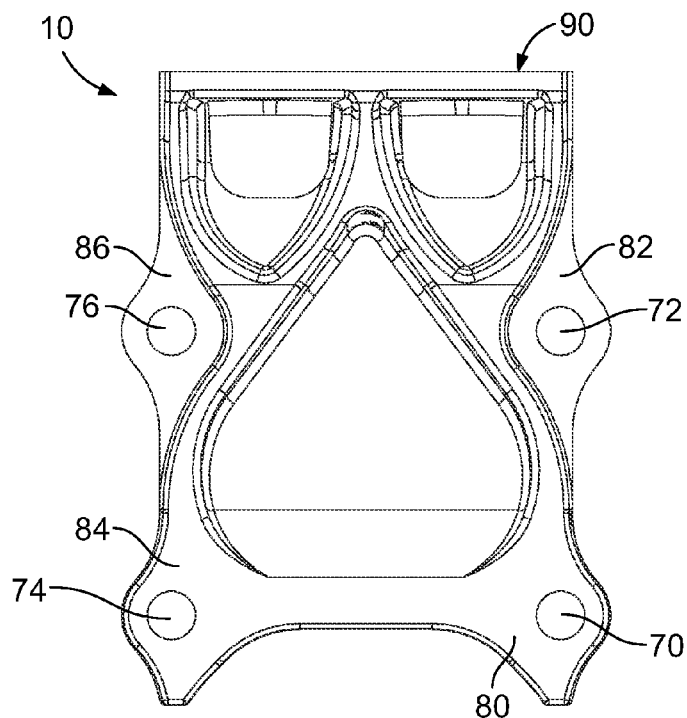
FIG. 5 is a rear view of frame hanger 10 shown in FIGS. 1-4.

FIG. 5 is a rear view of frame hanger 10 shown in FIGS. 1-4. FIG. 5 discloses throughhole 76 extending through the flat surface 86 on the rear end of upper bar pin interface 77, and throughhole 72 extending through the flat surface 82 on the rear end of upper bar pin interface 73. FIG. 5 also discloses throughhole 74 extending through the flat surface 84 on the rear end of lower bar pin interface 75, and throughhole 70 extending through the flat surface 80 on the rear end of upper bar pin interface 71.

Figure 6:
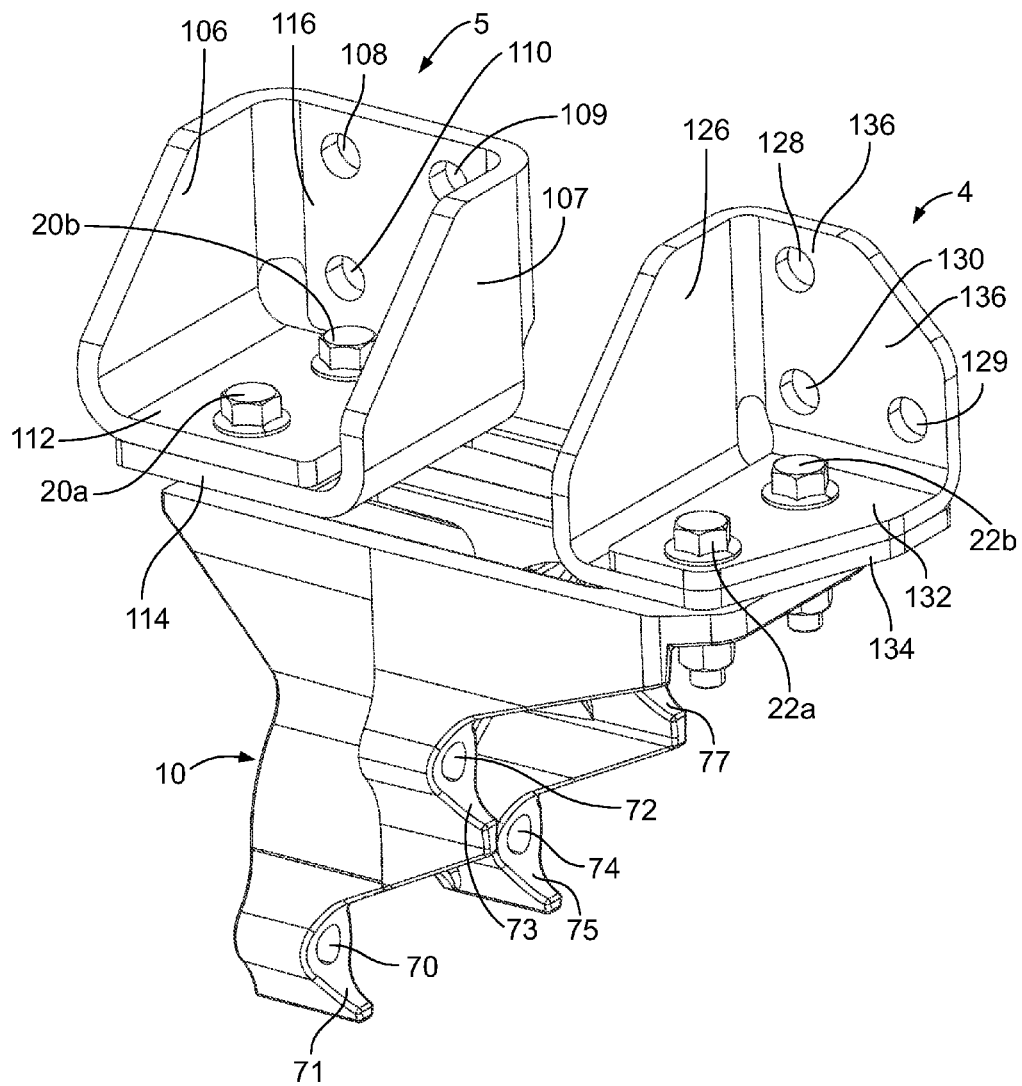
FIG. 6 is a perspective view of frame hanger 10 and frame brackets 4 and 5 shown in FIGS. 1 and 2 with the vehicle frame rail 30 removed.

FIG. 6 is a perspective view of frame hanger 10 and frame brackets 4 and 5 shown in FIGS. 1 and 2 with the vehicle frame rail 30 removed. Frame hanger 10 is shown with upper bar pin attachment interface 73 with throughhole 72, upper bar pin attachment interface 77, lower bar pin attachment interface 71 with throughhole 70, and lower bar pin attachment interface 75 with throughhole 74.

FIG. 6 further shows frame bracket 4 mounted to frame hanger 10 with bolts 22a and 22b. Frame bracket 4 is formed from a single plate that is bent to form side wall 126 and frame rail mounting wall 136, as well as base plate 132 and base plate 134. The structure and configuration of frame bracket 4 provides a strong connection between the frame hanger 10 and a vehicle frame rail. Frame rail mounting holes 128, 129, and 130 are positioned in frame rail mounting wall 136 and are used for mounting frame bracket 4 to the vehicle frame rail.

FIG. 6 also shows frame bracket 5 mounted to frame hanger 10 with bolts 20a and 20b. Frame bracket 5 is also shown formed from a single plate that is bent to form side wall 106, side wall 107, and frame rail mounting wall 116, as well as base plate 112 and base plate 114. The structure and configuration of frame bracket 5 provides a strong connection between the frame hanger 10 and a vehicle frame rail. Frame rail mounting holes 108, 109, and 110 are positioned in frame rail mounting wall 116 and are used for mounting frame bracket 5 to the vehicle frame rail.

Frame brackets 4 and 5 could also have different sizes or configurations suitable for attachment of frame hanger 10 to a vehicle frame rail. In addition, as noted above, frame brackets 4 and 5 could be a single frame bracket, or even be formed integrally with frame hanger 10. Frame brackets 4 and 5 may be made from a steel plate, or could also be made as a casting.

FIG. 7A is a right side perspective view of frame bracket 5 shown in FIG. 6, and FIG. 7B is a left side perspective view of frame bracket 5 shown in FIG. 6. FIGS. 7A and 7B show frame bracket 5 with bolts 20a and 20b for mounting frame bracket 5 to the frame hanger. Frame bracket 5 is also shown with side wall 106, side wall 107, and frame rail mounting wall 116, as well as base plate 112 and base plate 114. Frame rail mounting holes 108, 109, 110, and 111 are positioned in frame rail mounting wall 116 and are used for mounting frame bracket 5 to the vehicle frame rail.

FIG. 8A is a right side perspective view of frame bracket 4 shown in FIG. 6, and FIG. 8B is a left side perspective view of frame bracket 4 shown in FIG. 6. FIGS. 8A and 8B show frame bracket 4 with bolts 22a and 22b for mounting frame bracket 4 to frame hanger 10. Frame bracket 4 is shown with side wall 126 and frame rail mounting wall 136, as well as base plate 132 and base plate 134. Frame rail mounting holes 128, 129, and 130 are positioned in frame rail mounting wall 136 and are used for mounting frame bracket 4 to the vehicle frame rail.

Figure 9:
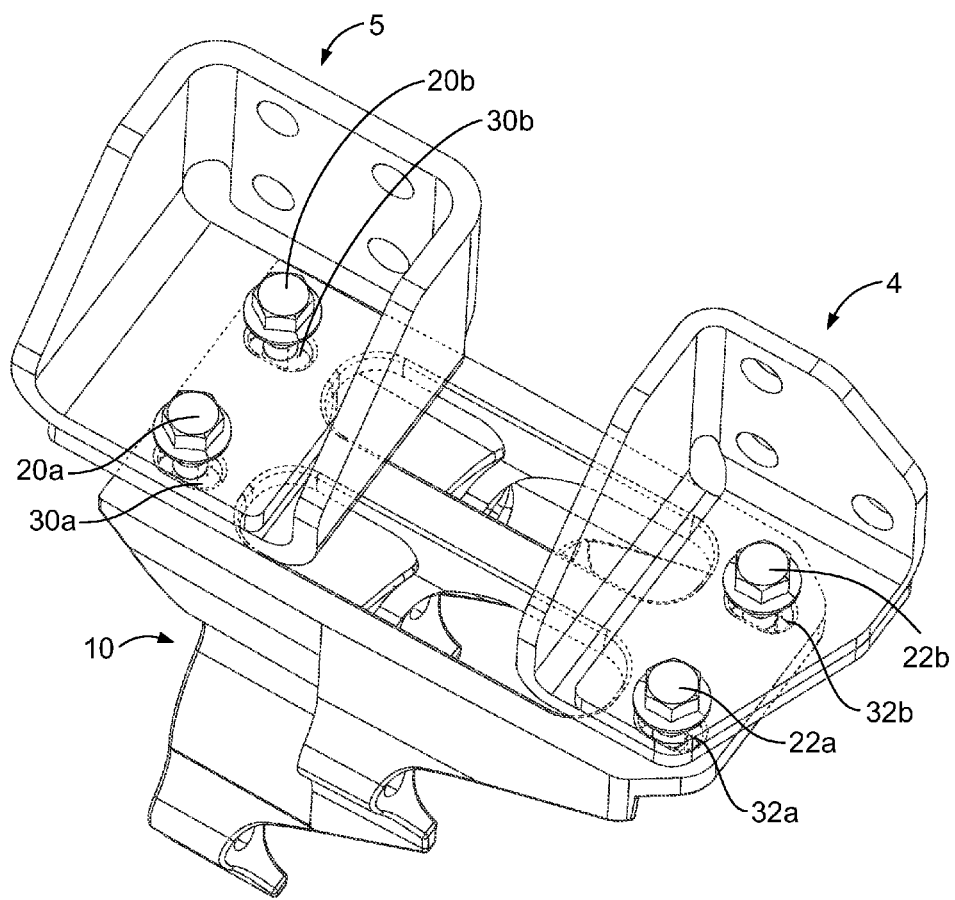
FIG. 9 is a another perspective view of frame hanger 10 and frame brackets 4 and 5 shown in FIGS. 1 and 2 with the vehicle frame rail 30 removed.

FIG. 9 is a another perspective view of frame hanger 10 and frame brackets 4 and 5 shown in FIGS. 1 and 2 with the vehicle frame rail 30 removed. Bolt 22a is shown extending through frame bracket 4 and through elongated slot 32a in frame hanger 10, and bolt 22b is shown extending through frame bracket 4 and through elongated slot 32b in frame hanger 10. Similarly, bolt 20a is shown extending through frame bracket 5 and through elongated slot 30a in frame hanger 10, and bolt 20b is shown extending through frame bracket 5 and through elongated slot 30b in frame hanger 10.

The elongated slots 32a and 32b in frame hanger 10, allow for relative longitudinal movement between frame hanger 10 and frame bracket 4, while elongated slots 30a and 30b in frame hanger 10 allow for relative longitudinal movement between frame hanger 10 and frame bracket 5. The elongated slots 30a, 30b, 32a, and 32b may be 0.5 inches in length to accommodate relative longitudinal movement between frame brackets 4 and 5 and frame hanger 10. This relative longitudinal movement also provides for relative movement between the frame hanger 10 and the vehicle frame rail 30 which the frame brackets 4 and 5 are fixedly mounted to. Furthermore, the frame hanger 10 is attached to the vehicle axle 40 (see FIGS. 1 and 10) via upper control arm 8 and upper axle attachment member 50, and via lower control arm 18 and lower axle attachment member 52. Therefore, relative longitudinal movement of the frame hanger 10 with respect to frame bracket 4 and frame bracket 5 also results in relative longitudinal movement between axle 40 and vehicle frame rail 30, which in turns allows for alignment of the thrust angle of the vehicle. In this manner, frame hanger 10 may be moved longitudinally relative to frame brackets 4 and 5 (and thus vehicle frame rail 30) to align the axle 40 so that it is perpendicular to a direction of thrust, as is desired. Moreover, the longitudinal movement of the frame hanger does not affect the pinion angle of the axle.

Figure 10:
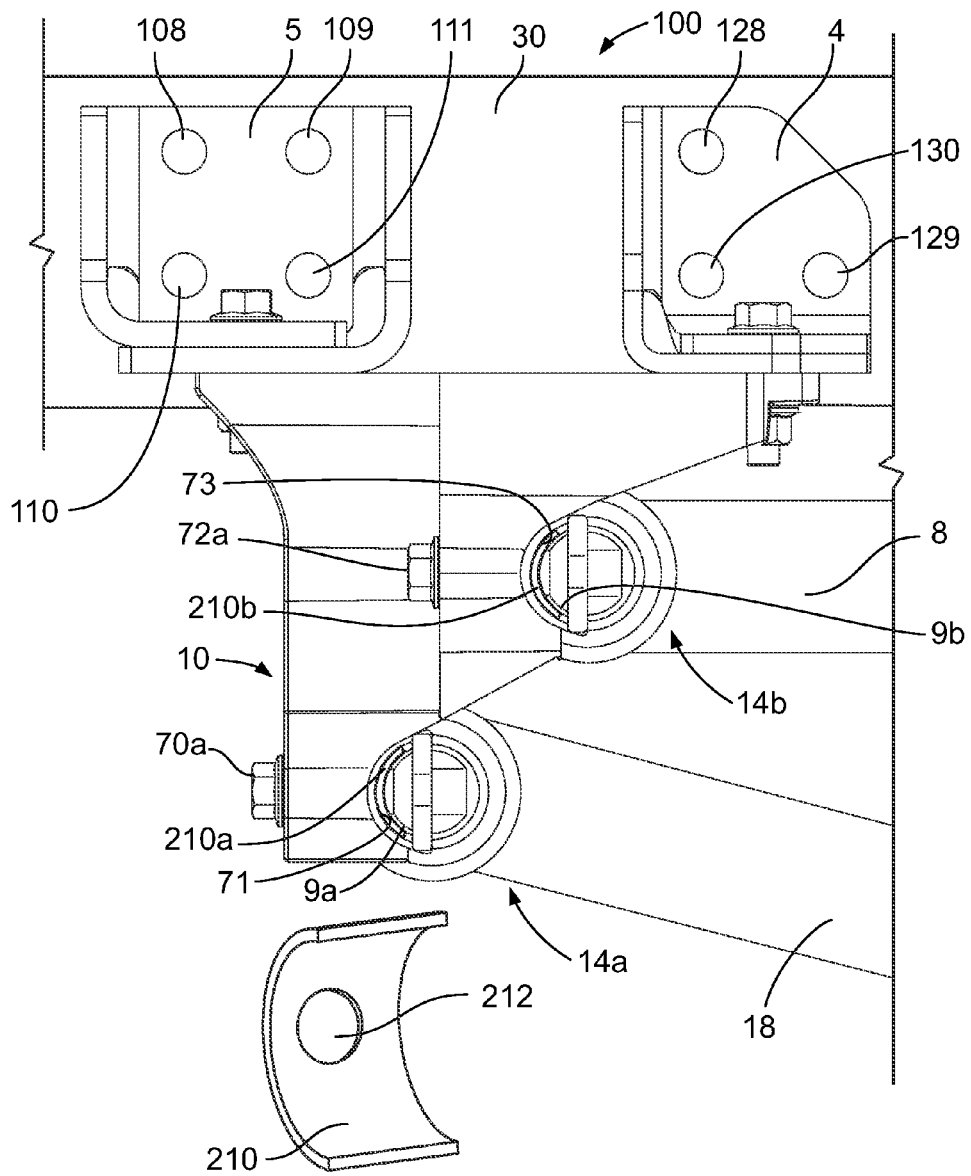
FIG. 10 is a front view of the left side of suspension 100 shown in FIG. 1 shown with shim 210 that can be used to adjust the axle pinion angle.
Figure 11:
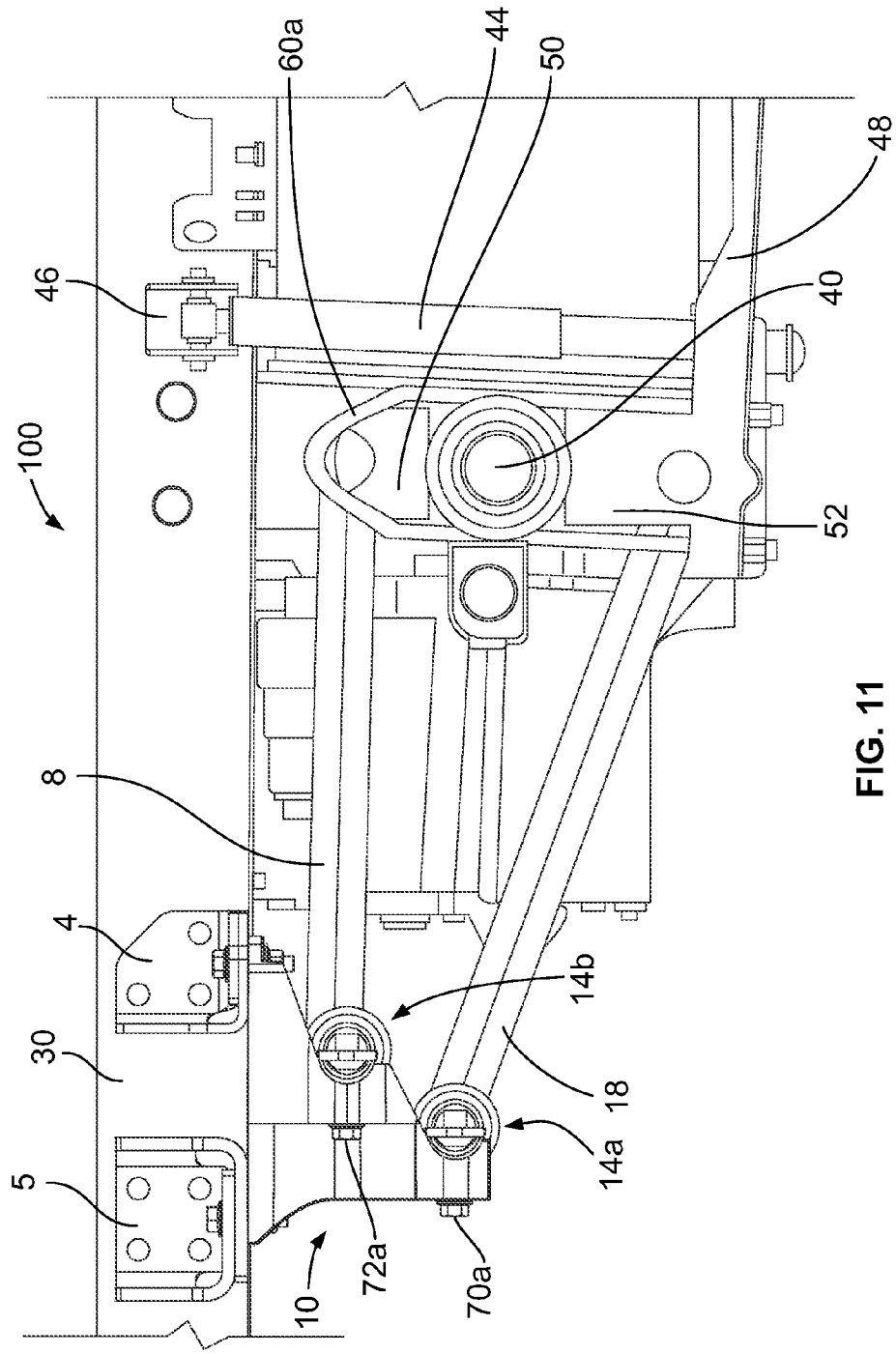
FIG. 11 is a front view of the suspension 100 shown in FIG. 1.

FIG. 10 is a front view of the left side of suspension 100 shown in FIG. 1 shown with shim 210 that can be used to adjust the pinion angle of the axle, and FIG. 11 is a front view of the suspension 100 shown in FIG. 1. With reference to FIGS. 10 and 11, suspension 100 is shown with frame brackets 4 and 5 positioned on vehicle frame rail 30. Upper control arm 8 is mounted to frame hanger 10 with cross arm bushing assembly 14b and bolt 72a, and lower control arm 18 is mounted to frame hanger 10 with cross arm bushing assembly 14a and bolt 70a. Upper control arm 8 is also mounted to vehicle axle 40 via upper axle attachment member 50 and U-shaped bolt 60a, and lower control arm 18 is also mounted to vehicle axle 40 via lower axle attachment member 52 and U-shaped bolt. A shock absorber 44 is attached to spring mount 48 and to vehicle frame rail 30 with attachment member 46.

It will be appreciated that a desired pinion angle of axle 40 may be obtained by adjusting the length of upper control arm 8 and/or lower control arm 18. Fine adjustments to the pinion angle of axle 40 may be made using shim 210 having a hole 212. A bolt, such as bolt 72a from cross arm bushing assembly 14b may pass through the hole 212 of shim 210 to sandwich shim 210 between a bar pin attachment interface and a bushing of a cross arm bushing assembly. In particular, shim 210b is shown positioned between upper bar pin attachment interface 73 and bushing 9b of cross arm bushing assembly 14b and held in place with bolt 72a. Similarly, shim 210a is shown positioned between lower bar pin attachment interface 71 and bushing 9a of cross arm bushing assembly 14a and held in place with bolt 70a.

The use of a shim, such as shim 210a or 210b, may be used to change the effective length of control arm 8 or 18, and provide for fine adjustments to the pinion angle of axle 40. Once the pinion angle is set, then suspension 100 provides for thrust angle alignment of axle 40 by providing for relative longitudinal movement between frame hanger 10 and frame brackets 4 and 5. As noted above, frame bracket 4 may be fixedly mounted to vehicle frame rail 30 using mounting holes 128, 129, and 130 in frame rail mounting wall 136 (identified in FIG. 6). Similarly, frame bracket 5 may be fixedly mounted to vehicle frame rail 30 using mounting holes 108, 109, 110, and 111 in frame rail mounting wall 115

(identified in FIG. 6). Relative longitudinal movement of the frame hanger 10 with respect to frame brackets 4 and 5 (and thus vehicle frame rail 30) causes the same relative longitudinal movement of axle 40 with respect to vehicle frame rail 30, allowing for alignment of the axle 40 with the direction of thrust of the vehicle, or the thrust line.

Importantly, because the axle 40 is connected to the frame hanger 10 via control arms 8 and 18, longitudinal movement of the frame hanger 10 with respect to the frame brackets 4 and 5 (and vehicle frame rail 30) has no effect on the pinion angle of axle 40. Therefore, thrust angle alignment may be advantageously performed independently of adjusting the pinion angle, and without affecting the pinion angle of the axle 40 after it has been set. Ideally, the axle 40 is aligned to be perpendicular to the direction of thrust. The elongated slots 30a, 30b, 32a, and 32b of frame hanger 10 allow for adjustment of the thrust angle 1.4 degrees in either direction from center.

It will also be appreciated that in an alternative embodiment, the base of frame brackets 4 and 5 could be provided with elongated slots, instead of frame hanger 10, and allow the same relative longitudinal movement between the frame hanger 10 and frame brackets 4 and 5 (and vehicle frame rail 30). Moreover, elongated longitudinal slots could also be provided in frame rail mounting wall 116 of frame bracket 5 and in frame rail mounting wall of frame bracket 4 to provide relative longitudinal movement between frame brackets 4 and 5 (and frame hanger 10) with vehicle frame rail 30.

Figure 12:
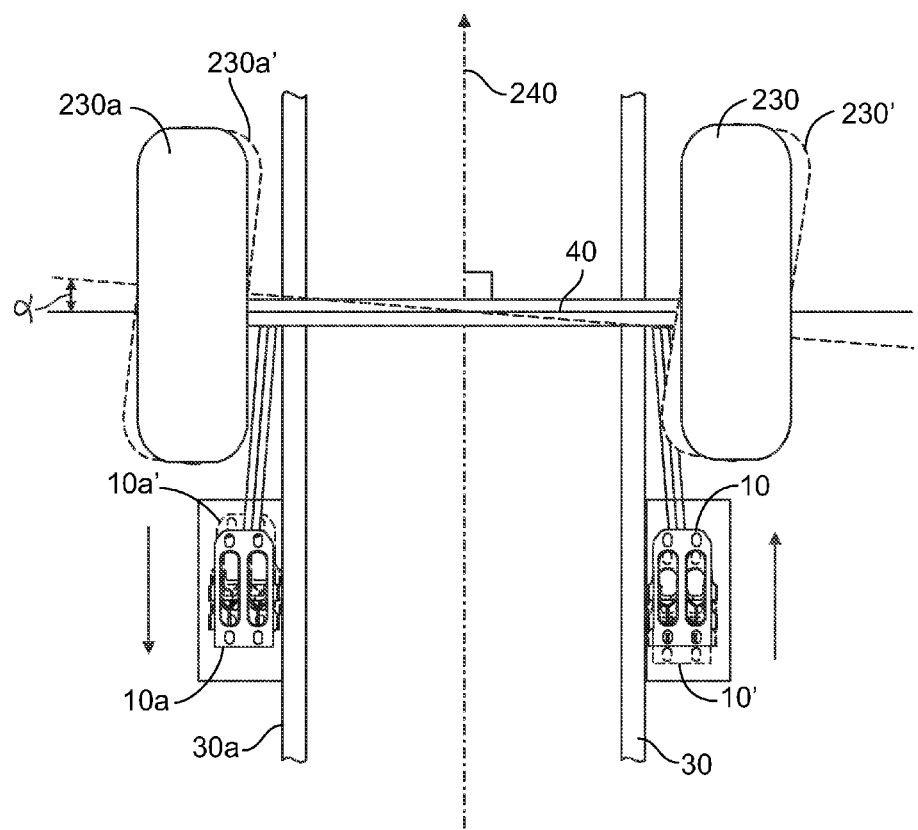
FIG. 12 is a top view showing how movement of frame hanger 10 forward from prior position of frame hanger 10' and movement of frame hanger 10a rearward from prior position 10a' can be used to align the axle 40 to be perpendicular to the direction of the direction of thrust 240, without affecting the axle pinion angle.

FIG. 12 is a top view showing how movement of frame hanger 10 forward from a prior position of frame hanger 10' and movement of frame hanger 10a rearward from prior position 10a' can be used to align the axle 40 with the direction of thrust 240, without affecting the pinion angle of the axle. Frame hanger 10 is shown mounted to vehicle frame rail 30 on one side and frame hanger 10a is shown mounted to vehicle frame rail 30a on the other side. Wheels 230 and 230a are shown attached to axle 40. Wheels 230' and 230a' are depicted in dotted lines and show that axle 40 is misaligned by thrust angle α when frame hangers are positioned as frame hangers 10' and 10a' (shown in dotted lines) on frame rails 30 and 30a. FIG. 12 demonstrates that moving the frame hanger forward longitudinally from position 10' to 10 on vehicle frame rail 30, and moving the frame hanger rearward longitudinally from position 10a' to 10a, results in the axle 40 being moved into alignment so that it is perpendicular to direction of thrust 240. Such axle angle alignment may be performed independently of, and without affecting the pinion angle of axle 40.

Example embodiments have been described above. Those skilled in the art will understand that changes and modifications may be made to the described embodiments without departing from the true scope and spirit of the present invention, which is defined by the claims.

We claim:

1. A frame hanger for use in a vehicle suspension comprising:
   a frame attachment portion having a first mounting surface and a second mounting surface;
   a first control arm mounting portion positioned beneath the frame attachment portion;
   wherein a first plurality of elongated longitudinally extending slots extend through the first mounting surface of the frame attachment portion; and
   wherein a second plurality of elongated longitudinally extending slots extend through the second mounting surface of the frame attachment portion;
   wherein the first plurality of elongated longitudinally extending slots on the first mounting surface of the frame attachment portion correspond to a first plurality of holes positioned on a vehicle frame rail for mounting the frame attachment portion to the vehicle frame rail; and
   the second plurality of elongated longitudinally extending slots on the second mounting surface of the frame attachment portion correspond to a second plurality of holes positioned on the vehicle frame rail for mounting the frame attachment portion to the vehicle frame rail.

2. The frame hanger of claim 1, wherein the first plurality of elongated longitudinally extending slots on the first mounting surface of the frame attachment portion are positioned in a frame bracket attached to a first end of the frame attachment portion; and
   the second plurality of elongated longitudinally extending slots on the second mounting surface of the frame attachment portion are positioned in the frame bracket attached to a second end of the frame attachment portion.

3. The frame hanger of claim 2, wherein the frame bracket is comprised of a first frame bracket portion attached to the first end of the frame attachment portion and a second frame bracket portion, separate from the first frame bracket portion, attached to the second end of the frame attachment portion.

4. A frame hanger for use in a vehicle suspension comprising:
   a frame attachment portion having a first mounting surface and a second mounting surface;
   a first control arm mounting portion positioned beneath the frame attachment portion;
   wherein a first plurality of elongated longitudinally extending slots extend through the first mounting surface of the frame attachment portion;
   wherein a second plurality of elongated longitudinally extending slots extend through the second mounting surface of the frame attachment portion;
   wherein the first plurality of elongated longitudinally extending slots on the first mounting surface of the frame attachment portion correspond to a first plurality of holes positioned on a frame bracket for mounting the frame attachment portion to the frame bracket;
   wherein the second plurality of elongated longitudinally extending slots on the second mounting surface of the frame attachment portion correspond to a second plurality of holes positioned on the frame bracket for mounting the frame attachment portion to the frame bracket;
   wherein the frame bracket further includes a third plurality of holes for mounting the frame bracket to a vehicle frame rail; and
   wherein the frame bracket further includes a fourth plurality of holes for mounting the frame bracket to the vehicle frame rail.

5. The frame hanger of claim 4, wherein the frame bracket is comprised of a first frame bracket portion attached to the first end of the frame attachment portion and a second frame bracket portion, separate from the first frame bracket portion, attached to the second end of the frame attachment portion.

6. The frame hanger of claim 5, wherein the frame attachment portion may be moved longitudinally relative to the first frame bracket portion and the second frame bracket portion, such that the first plurality of elongated longitudinally extending slots on the first mounting surface still correspond to the first plurality of holes positioned on the first frame bracket and the second plurality of elongated longitudinally extending slots on the second mounting surface still correspond to the second plurality of holes positioned on the second frame bracket.

7. The frame hanger of claim 6, wherein the first control arm mounting portion includes a first upper bar pin attachment interface, a second upper bar pin attachment interface, and a first control arm slot positioned between the first upper bar pin attachment interface and the second upper bar pin attachment interface.

8. The frame hanger of claim 7, wherein the first upper bar pin attachment interface comprises a first curved surface and a first flat surface, with a first throughhole extending from the first curved surface to the first flat surface; and
wherein the second upper bar pin attachment interface comprises a second curved surface and a second flat surface, with a second throughhole extending from the second curved surface to the second flat surface.

9. The frame hanger of claim 7, wherein the frame hanger includes a second control arm mounting portion beneath the first control arm mounting portion, said second control arm mounting portion including a first lower bar pin attachment interface, a second lower bar pin attachment interface, and a second control arm slot positioned between the first lower bar pin attachment interface and the second lower bar pin attachment interface.

10. The frame hanger of claim 9, wherein the first upper bar pin attachment interface comprises a first curved surface and a first flat surface, with a first throughhole extending from the first curved surface to the first flat surface;
wherein the second upper bar pin attachment interface comprises a second curved surface and a second flat surface, with a second throughhole extending from the second curved surface to the second flat surface;
wherein the first lower bar pin attachment interface comprises a third curved surface and a third flat surface, with a third throughhole extending from the third curved surface to the third flat surface; and
wherein the second lower bar pin attachment interface comprises a fourth curved surface and a fourth flat surface, with a fourth throughhole extending from the fourth curved surface to the fourth flat surface.

11. The frame hanger of claim 4, wherein one or more of the first or second plurality of longitudinally extending slots are open at one end.

12. The frame hanger of claim 4, wherein the first control arm mounting portion includes a first upper bar pin attachment interface, a second upper bar pin attachment interface, and a first control arm slot positioned between the first upper bar pin attachment interface and the second upper bar pin attachment interface.

13. The frame hanger of claim 12, wherein the first upper bar pin attachment interface comprises a first curved surface and a first flat surface, with a first throughhole extending from the first curved surface to the first flat surface; and
wherein the second upper bar pin attachment interface comprises a second curved surface and a second flat surface, with a second throughhole extending from the second curved surface to the second flat surface.

14. The frame hanger of claim 12, wherein the frame hanger includes a second control arm mounting portion beneath the first control arm mounting portion, said second control arm mounting portion including a first lower bar pin attachment interface, a second lower bar pin attachment interface, and a second control arm slot positioned between the first lower bar pin attachment interface and the second lower bar pin attachment interface.

15. The frame hanger of claim 14, wherein the first upper bar pin attachment interface comprises a first curved surface and a first flat surface, with a first throughhole extending from the first curved surface to the first flat surface;
wherein the second upper bar pin attachment interface comprises a second curved surface and a second flat surface, with a second throughhole extending from the second curved surface to the second flat surface;
wherein the first lower bar pin attachment interface comprises a third curved surface and a third flat surface, with a third throughhole extending from the third curved surface to the third flat surface; and
wherein the second lower bar pin attachment interface comprises a fourth curved surface and a fourth flat surface, with a fourth throughhole extending from the fourth curved surface to the fourth flat surface.

16. A frame hanger for use in a vehicle suspension comprising:
a frame attachment portion having a first mounting surface and a second mounting surface;
a first control arm mounting portion positioned beneath the frame attachment portion;
a frame bracket mounted to the first and second mounting surfaces of the frame attachment portion; said frame bracket having a first plurality of elongated longitudinally extending slots that correspond to a first plurality of holes in the first mounting surface of the frame attachment portion, and having a second plurality of elongated longitudinally extending slots that correspond to a second plurality of holes in the second mounting surface of the frame attachment portion.

17. The frame hanger of claim 16, wherein the frame bracket is comprised of a first frame bracket portion having the first plurality of elongated longitudinally extending slots, and a second frame bracket portion, separate from the first frame bracket portion, the second frame bracket portion having the second plurality of elongated longitudinally extending slots.

18. The frame hanger of claim 17, wherein the frame attachment portion may be moved longitudinally relative to the first frame bracket portion and the second frame bracket portion, such that the first plurality of elongated longitudinally extending slots on the first frame bracket portion still correspond to a first plurality of holes positioned on the first mounting surface of the frame attachment portion and the second plurality of elongated longitudinally extending slots on the second frame bracket portion still correspond to a second plurality of holes positioned on the second mounting surface of the frame attachment portion.

19. A suspension assembly for supporting a longitudinally extending vehicle frame rail, comprising:
a frame hanger;
an axle attachment member mounted to a first vehicle axle;
a first control arm having a first end mounted to, and extending from, a first control arm mounting portion positioned on the frame hanger; and said first control arm having a second end mounted to the axle attachment member;
wherein the frame hanger includes a frame attachment portion having a first mounting surface and a second mounting surface;
wherein the first control arm mounting portion is positioned beneath the frame attachment portion;
wherein a first plurality of elongated longitudinally extending slots extend through the first mounting surface of the frame attachment portion;

wherein a second plurality of elongated longitudinally extending slots extend through the second mounting surface of the frame attachment portion;

wherein the first plurality of elongated longitudinally extending slots on the first mounting surface of the frame attachment portion correspond to a first plurality of holes positioned on a vehicle frame rail for mounting the frame attachment portion to the vehicle frame rail; and the second plurality of elongated longitudinally extending slots on the second mounting surface of the frame attachment portion correspond to a second plurality of holes positioned on the vehicle frame rail for mounting the frame attachment portion to the vehicle frame rail.

20. The suspension assembly of claim 19, wherein the first plurality of elongated longitudinally extending slots on the first mounting surface of the frame attachment portion are positioned in a frame bracket attached to a first end of the frame attachment portion; and the second plurality of elongated longitudinally extending slots on the second mounting surface of the frame attachment portion are positioned in the frame bracket attached to a second end of the frame attachment portion.

21. The suspension assembly of claim 20, wherein the frame bracket is comprised of a first frame bracket portion attached to the first end of the frame attachment portion and a second frame bracket portion, separate from the first frame bracket portion, attached to the second end of the frame attachment portion.

22. The suspension assembly of claim 19, further including a second control arm having a first end mounted to, and extending from, a second control arm mounting portion positioned on the frame hanger; and said second control arm having a second end mounted to the axle attachment member.

23. A suspension assembly for supporting a longitudinally extending vehicle frame rail, comprising:
a frame hanger;
an axle attachment member mounted to a first vehicle axle;
a first control arm having a first end mounted to, and extending from, a first control arm mounting portion positioned on the frame hanger; and said first control arm having a second end mounted to the axle attachment member;
wherein the frame hanger includes a frame attachment portion having a first mounting surface and a second mounting surface;
wherein the first control arm mounting portion is positioned beneath the frame attachment portion;
wherein a first plurality of elongated longitudinally extending slots extend through the first mounting surface of the frame attachment portion;
wherein a second plurality of elongated longitudinally extending slots extend through the second mounting surface of the frame attachment portion; wherein the first plurality of elongated longitudinally extending slots on the first mounting surface of the frame attachment portion are positioned in a frame bracket attached to a first end of the frame attachment portion; and
the second plurality of elongated longitudinally extending slots on the second mounting surface of the frame attachment portion are positioned in the frame bracket attached to a second end of the frame attachment portion.

24. The suspension assembly of claim 23, wherein the frame bracket is comprised of a first frame bracket portion attached to the first end of the frame attachment portion and a second frame bracket portion, separate from the first frame bracket portion, attached to the second end of the frame attachment portion.

25. The suspension assembly of claim 24, wherein the frame attachment portion may be moved longitudinally relative to the first frame bracket portion and the second frame bracket portion, such that the first plurality of elongated longitudinally extending slots on the first frame bracket portion still correspond to a first plurality of holes positioned on the first mounting surface of the frame attachment portion and the second plurality of elongated longitudinally extending slots on the second frame bracket portion still correspond to a second plurality of holes positioned on the second mounting surface of the frame attachment portion; and wherein the longitudinal movement of the frame attachment portion may be used to align the axle with a direction of thrust of the vehicle without adjusting a pinion angle of the axle.

26. A suspension assembly for supporting a longitudinally extending vehicle frame rail, comprising:
a frame hanger;
an axle attachment member mounted to a first vehicle axle;
a first control arm having a first end mounted to, and extending from, a first control arm mounting portion positioned on the frame hanger; and said first control arm having a second end mounted to the axle attachment member;
wherein the frame hanger includes a frame attachment portion having a first mounting surface and a second mounting surface;
wherein the first control arm mounting portion is positioned beneath the frame attachment portion;
wherein a first plurality of elongated longitudinally extending slots extend through the first mounting surface of the frame attachment portion;
wherein a second plurality of elongated longitudinally extending slots extend through the second mounting surface of the frame attachment portion; wherein the first plurality of elongated longitudinally extending slots on the first mounting surface of the frame attachment portion correspond to a first plurality of holes positioned on a frame bracket for mounting the frame attachment portion to the frame bracket;
wherein the second plurality of elongated longitudinally extending slots on the second mounting surface of the frame attachment portion correspond to a second plurality of holes positioned on the frame bracket for mounting the frame attachment portion to the frame bracket,
wherein the frame bracket further includes a third plurality of holes for mounting the frame bracket to a vehicle frame rail; and
wherein the frame bracket further includes a fourth plurality of holes for mounting the frame bracket to the vehicle frame rail.

27. The suspension assembly of claim 26, wherein the frame bracket is comprised of a first frame bracket portion attached to the first mounting surface of the frame attachment portion and a second frame bracket portion, separate from the first frame bracket portion, attached to the second mounting surface of the frame attachment portion.

28. The suspension assembly of claim 27, wherein the frame attachment portion may be moved longitudinally relative to the first frame bracket portion and the second frame bracket portion, such that the plurality of elongated longitudinally extending slots on the first mounting surface still correspond to the first plurality of holes positioned on the first frame bracket portion and the second plurality of elongated longitudinally extending slots on the second mounting surface still correspond to the second plurality of holes positioned on the second frame bracket portion; and wherein the longitudinal movement of the frame attachment portion may be used to align the axle with a direction of thrust of the vehicle without adjusting a pinion angle of the axle.

* * * * *